United States Patent Office.

L. OTTO P. MEYER, OF BETHLEHEM, PENNSYLVANIA.

Letters Patent No. 66,101, dated June 25, 1867.

IMPROVEMENT IN THE MANUFACTURE OF SAFETY-MATCHES.

*The Schedule referred to in these Letters Patent and making part of the same.*

TO ALL WHOM IT MAY CONCERN:

Be it known that I, L. OTTO P. MEYER, now of the town of Bethlehem, Northampton county, and State of Pennsylvania, have invented certain new and usuful improvements in the Manufacture of Safety-Matches; and I do hereby declare that the following is a full, clear, and exact description thereof.

Prior to my discovery, Hjerpe had patented his safety-match, date of 13th October, 1863. But to the best of my knowledge no other matches, even if called "safety-matches," are manufactured without the employment of phosphorus or other dangerous ingredients, which even if but employed in the special surfaces for rubbing the match on, involve danger of setting fire to the special surfaces whilst igniting the match.

Although I claim for my match superiority over all all other matches, still I shall have to compare it only with Hjerpe's safety-match. In view of this I will first state the variation from the original manufacture of Hjerpe's safety-match in as far as has come to my knowledge as being made by Hjerpe or others.

I received information that metallic oxide was no longer employed in the compound for matches, and that the best proportion for the altered compound would be as follows, viz, six parts chlorate of potassa; one part bichromate of potassa; two to three parts powdered glass; three parts gum arabic.

I also was informed that the compound for the special surfaces, viz, twenty parts sulphuret of antimony, two parts bichromate of potassa, three parts colcothar, two parts powdered glass, three parts glue, as is described in Hjerpe's patent as compound No. 1, for special surfaces, received preference over compound No. 2 in said patent. It was observed that colcothar generally contains sufficient sulphuric acid, wherefore sulphate of iron, as added in compound No. 2, was not necessary. No other alterations made by Hjerpe, or by others, have come to my knowledge, and to the best of my experience the above-said variation from the original match compound made the match inferior to the original match.

According to my own experiments with Hjerpe's match compound, I found the best proportion by weight to be—

1. 55 per cent. chlorate of potassa.
   10 per cent. bichromate of potassa.
   10 per cent. binoxide of manganese $M_nO_2$, or any other pure metallic oxide.
   15 per cent. powdered glass.
   10 per cent. gelatine.

100. Or, 2. 55 per cent. chlorate of potassa.
   5 per cent. bichromate of potassa.
   5 per cent. binoxide of manganese, (or as before stated in No. 1.)
   25 per cent. powdered glass.
   10 per cent. gelatine.

100

These proportions answer admirably well for match-sticks previously dipped in or prepared with wax or liquid amber, *Styraci flua*, or the composition of adamantine candles, as well as for such prepared with sulphur, or with any other ingredient commonly used for such dipping. But I prefer wax or composition of adamantine candles; and Hjerpe's matches manufactured in such manner are really beautiful and safe matches.

I do not underrate the value of bichromate of potassa, nor of metallic oxide, in Hjerpe's compound for matches. The bichromate of potassa acts very usefully as a tinder, and acts also very favorably on the gum or glue, making these latter better qualified to resist dampness. The metallic oxide, if pure, and not put in such great proportions as to induce the chlorate of potassa to part with its oxygen at a lower degree of heat, adds to the brightness of the flame. Omitting bichromate of potassa out of Hjerpe's match compound will prevent ignition of the match, except there be metallic oxide containing sulphuric acid employed. Still, several of my own experiments lead me to the discovery that I could produce a match compound by the use of fewer and simpler, air-purifying, and even healthful ingredients, and also more in accordance with scientific principles.

This my discovered new compound for safety-matches consists of, first, chlorate of potassa; second, gelatine, (J. and G. Cox's refined, or any of equal purity;) third, quartz or pumice-stone, or any of the other varieties of silex, preferring the pure white quartz, if quartz be used. Various proportions give good results. Those preferred by me are:

1. 56 per cent. chloride of potassa.
   20 per cent. pure gelatine.
   24 per cent. quartz or pumice-stone.
   ———
   100. Or, 2. 56 per cent. chlorate of potassa.
   16 per cent. pure gelatine.
   28 per cent. quartz or pumice-stone.
   ———
   100

I consider it no improvement to add ingredients which do neither harm nor good; but still, if the original white color of my compound should be desired to be changed, then a little brick dust, (say from one to two per cent. of red brick dust will give a beautiful rose color,) or some colored clay, or colored quartz, free from injurious impurities, may be added, and the percentage of white quartz or pumice-stone as much decreased.

My general mode of preparing and mixing, is, first, to soak the gelatine in about five times its weight of pure rain water; then to boil it once fairly up to foaming. After being cooled down to a temperate degree, each part of gelatine ought to hold about three or three and a half parts of water, to be most suitable for the after procedure. The jelly being put in a stone or Wedgewood-ware mortar, I rub down in it the chlorate of potassa, next the powdered quartz or pumice-stone, till a uniform paste is formed, feeling to the touch of the pestle like an oily substance. If the compound should be too thick for the dipping, then a little water is to be added, or, if too thin, it may be allowed to stand to evaporate, or be more rapidly evaporated by a water bath.

The dipping process has nothing unusual. A moderate temperature in the room is sufficient to keep the compound in suitable condition; although it is well to have the match-sticks, which are previously prepared with wax, or other substances, as stated above in connection with Hjerpe's match, warmed up to about 90° Fahrenheit. Matches made by this my new compound ignite with ease on Hjerpe's special surfaces, and have all the good qualities claimed by Hjerpe's safety-match. Ignition on surfaces containing phosphorus is of course self-evident. The Hjerpe safety-match will withstand a heat of about 550° Fahrenheit, without inflaming its compound, although the sticks will char at a lower degree. The match made according to my new discovery will equally withstand about 600° Fahrenheit. As regards resisting dampness I obtained most satisfactory results with my match.

I will now state the second part of my discovery, which regards the special surfaces for igniting the matches. My various experiments lead me to the discovery that useful surfaces for igniting safety-matches, as well as other matches, might be manufactured by the application of red prussiate of potash, $3KC_y$, $F_{e2}$, $C_{y3}$, or by yellow prussiate of potash, $2KC_y$, $F_eC_y+3HO$. Either of these ingredients, but especially the red, if mixed with a binding substance, as gum for instance, will produce a paste suitable for igniting safety-matches. Powdered glass or aluminous earth will improve this paste. But trying various ingredients in connection with said prussiates of potash, I obtained the best results by mixing golden sulphuret of antimony or sulphuret of antimony with them. Although surfaces thus produced may have superiority over surfaces containing phosphorus, they are still inferior to Hjerpe's surfaces. Hjerpe's special surfaces are in reality as perfect as desirable.

My object in including these prussiates of potash in my present claim for a patent is to prevent others who may make the same discovery from imposing such as an improvement on the public to the injury of the manufacturers under Hjerpe's patent, as well as to the injury of the public in general.

I disclaim to use any of my above-stated discoveries in opposition to Hjerpe's right or interest. I will not prevent Hjerpe, nor any one holding rights under him for the manufacture of his matches, from the use of my said discoveries; nor will I myself make use of my said discoveries for practical purposes without Hjerpe's consent.

As I am Hjerpe's representative in this country for all matters concerning his United States Patent of 13th October, 1863, I considered it my duty to give the above information, and to make application for protection for my said improvements.

I hereby state that I only claim, as the subject of this patent, a variation in the manufacture of safety-matches; and I claim the application of the whole of the said improvements to the extent before pointed out and explained, under the patent right of J. W. Hjerpe, the original inventor of the safety-match.

Having fully described my invention, what I claim, and desire to secure by Letters Patent of the United States, is—

1. The application of certain ingredients, substantially such as herein specified, for the preparation of a compound for safety-matches, and for the purpose specified within.

2. The application of certain ingredients, substantially such as herein specified, for the preparation of special surfaces for the ignition of safety-matches, and for the purpose specified within.

L. OTTO P. MEYER.

Witnesses.
  JAS. L. SELFRIDGE,
  G. W. PERKIN.